United States Patent
Meyer et al.

(10) Patent No.: US 12,374,740 B2
(45) Date of Patent: Jul. 29, 2025

(54) BATTERY MODULE AND BATTERY SYSTEM WITH HEAT EXCHANGER HOUSING

(71) Applicant: WHITEMARK TECHNOLOGY GMBH, Altenstadt (DE)

(72) Inventors: Stefan Andreas Meyer, Wellington (NZ); Peter Adam, Wellington (NZ)

(73) Assignee: WHITEMARK TECHNOLOGY GMBH, Altenstadt (DE)

(*) Notice: Subject to any disclaimer, the term of this patent is extended or adjusted under 35 U.S.C. 154(b) by 146 days.

(21) Appl. No.: 18/290,508

(22) PCT Filed: May 14, 2021

(86) PCT No.: PCT/EP2021/062805
§ 371 (c)(1),
(2) Date: Nov. 14, 2023

(87) PCT Pub. No.: WO2022/237986
PCT Pub. Date: Nov. 17, 2022

(65) Prior Publication Data
US 2024/0258612 A1    Aug. 1, 2024

(51) Int. Cl.
*H01M 10/6568* (2014.01)
*H01M 10/613* (2014.01)
*H01M 10/6556* (2014.01)
*H01M 50/233* (2021.01)

(52) U.S. Cl.
CPC ..... *H01M 10/6568* (2015.04); *H01M 10/613* (2015.04); *H01M 10/6556* (2015.04); *H01M 50/233* (2021.01)

(58) Field of Classification Search
CPC ........... H01M 10/6568; H01M 10/613; H01M 10/6556; H01M 50/233; H01M 10/643; H01M 50/213; H01M 10/625; Y02E 60/10
See application file for complete search history.

(56) References Cited

U.S. PATENT DOCUMENTS

| | | | | |
|---|---|---|---|---|
| 6,106,972 A | * | 8/2000 | Kokubo | B60L 58/26 429/120 |
| 11,777,157 B2 | * | 10/2023 | Ju | H01M 10/6556 429/120 |
| 2015/0380782 A1 | * | 12/2015 | Youngs | H01M 10/613 429/72 |
| 2020/0266403 A1 | * | 8/2020 | Stuetz | H01M 50/209 |

FOREIGN PATENT DOCUMENTS

| | | |
|---|---|---|
| EP | 2950379 A1 | 12/2015 |
| EP | 2973841 B1 | 11/2018 |
| EP | 3696876 A1 | 8/2020 |
| JP | 2016091951 A | 5/2016 |
| WO | 2012089132 A1 | 7/2012 |
| WO | 2022129387 A1 | 6/2022 |

OTHER PUBLICATIONS

Machine assisted English translation of WO2022129387A1 obtained from https://patents.google.com/patent on Jan. 13, 2025, 10 pages.
International Search Report for PCT/EP2021/062805 dated Jan. 28, 2022, 2 pages.
Machine assisted English translation of EP2950379 obtained from https://patents.google.com/patent on Nov. 8, 2023, 8 pages.
Machine assisted English translation of JP2016091951A obtained from https://patents.google.com/patent on Jan. 23, 2025, 10 pages.

* cited by examiner

*Primary Examiner* — Muhammad S Siddiquee
(74) *Attorney, Agent, or Firm* — Warner Norcross + Judd LLP (57) ABSTRACT

A battery module comprising a liquid-tight housing and a plurality of battery cells arranged in the liquid-tight housing is disclosed. A first tempering fluid is included in the liquid-tight housing in thermal contact with the plurality of battery cells and with an inner surface of the liquid-tight housing. The liquid-tight housing is constructed to allow for a flow of a second tempering fluid between the inner surface and an outer surface of the liquid-tight housing. Further provided is a battery system comprising a battery module and a secondary tempering system connected to the liquid-tight housing of the battery module. The secondary tempering system is configured to establish the flow of the second tempering fluid.

17 Claims, 10 Drawing Sheets

BATTERY MODULE AND BATTERY SYSTEM WITH HEAT EXCHANGER HOUSING

CROSS-REFERENCE TO RELATED APPLICATIONS

This application is the U.S. National Stage of International Application No. PCT/EP2021/062805 filed on 14 May 2021, the contents of which are hereby incorporated by reference.

FIELD OF THE DISCLOSURE

The present invention relates to a battery module and a battery system allowing for efficient and homogeneous tempering of battery cells.

BACKGROUND

In view of the prospective limited availability of classical fuels and the increasing level of air pollution due to engine exhaust gases, focus has been laid on alternative drive solutions in recent years. Irrespective of the primary energy source, most approaches require battery modules and systems with a high power density, a long lifetime and high performance.

Building a battery system is the mechanical, electrical and thermal integration of a large number of battery cells into a working unit. Further aspects to consider are chemical compatibility of the used components, safety features in case of a thermal runaway and ease of mass production.

Adequate temperature control of each battery cell within a battery system is a key requirement, in particular, when charging or discharging the battery. Failure to adhere to temperature limits of, for instance, lithium-ion battery cells may lead to gradual deterioration of the battery performance or even to a rapid and dangerous destruction of the battery.

Conventionally, controlling the temperature of battery cells in a battery system may be performed indirectly, for instance, by providing a cooling body in thermal contact with base portions of cylindrical battery cells. A flow of a tempering fluid is established though channels included in the cooling body. In this way, heat generated by the battery cell is transferred via its shell into the cooling body. This setup exhibits a high thermal inertia, leading to large temperature peaks in the case of a high load or during charging. Said temperature peaks may be prevented by limiting the maximum current. However, the conventional system does not allow for rapid load changes.

Alternatively, the battery cells may be cooled directly via a tempering fluid in direct thermal contact with the battery cells. For this purpose, a liquid-tight hollow space may be provided around the shells of the battery cells. By pumping the tempering fluid through said hollow spaces, heat, which is mainly generated at the poles of the battery cells, it transferred through the shells towards the tempering fluid. This technique is known as immersion cooling. A disadvantage of such a system is that each hollow space around the shells of the battery cells requires a liquid-tight seal, usually at two locations of the shells of the battery cells.

In more sophisticated systems, the battery cells are entirely immersed into a tempering fluid. This setup requires a large amount of tempering fluid, leading to an increased weight and costs of the system. Further, the tempering fluid has to exhibit specific characteristics, because it is not only in contact with the shells of the battery cells, but also with the poles.

BRIEF SUMMARY

An object of the present invention is to provide an improved battery module and battery system allowing for efficient, homogeneous tempering of the battery cells. Efficient, homogeneous tempering is accomplished via elements of the claimed invention.

The present invention relates to a battery module, comprising a liquid-tight housing and a plurality of battery cells arranged in the liquid-tight housing. The battery module further comprises a first tempering fluid included in the liquid-tight housing in thermal contact with the plurality of battery cells and with an inner surface of the liquid-tight housing. The liquid-tight housing is constructed to allow for a flow of a second tempering fluid between the inner surface and an outer surface of the liquid-tight housing.

In other words, the battery module comprises multiple battery cells within a housing. The housing is liquid-tight. That is, the first tempering fluid included in the housing does not find its way to an outside of the housing. However, the liquid-tight housing may comprise openings, for instance, for electrical feedthroughs or signal lines. Further, the liquid-tight housing may comprise openings, through which the interior of the liquid-tight housing is connected to a channel, a tube, a pipe or the like for the first tempering fluid. However, said openings (feedthrough openings, fluid connection openings) are sealed against the ambient environment.

Each battery cell is in thermal contact with the first tempering fluid. In particular, the tempering fluid may, in particular, cover pole sections of each battery cell, as heat is mainly generated at the pole sections. Further, the first tempering fluid is in thermal contact with an inner surface of the housing. For instance, the first tempering fluid may be in contact with the entire inner surface of the housing or a portion of the entire inner surface of the housing. Hence, heat generated by the battery cells may be transferred via the first tempering fluid to the housing. This may be realized via conduction or convection, for example. Within the housing, i.e. between the inner surface and the outer surface of the housing, a flow of a second tempering fluid may be established, for instance, by a secondary tempering system. For this purpose, the housing is constructed so as to allow for the flow of the second tempering fluid. For instance, the walls of the housings may comprise inner hollow spaces for the flow of the second tempering fluid. In other words, wall sections of the liquid-tight housing may be constructed so as to allow for the flow of the second tempering fluid within said wall sections. In particular, the wall section arranged for the flow of the second tempering fluid may correspond to the inner surface of the liquid-tight housing (or a portion thereof), which is in thermal contact with the first tempering fluid within the liquid-tight housing.

With said setup, the liquid-tight housing of the battery module may serve as a heat exchanger between the inner primary tempering system, e.g. the first tempering fluid contained in the housing, and an external secondary tempering system, in particular a second tempering fluid flowing through the walls of the housing. As the second tempering fluid is not in contact with the battery cells, the requirements regarding the characteristics of said second tempering fluid are lower. Specifically, the second tempering fluid may not be required to be a dielectric. Further, the battery module is an independent compact unit with an integrated heat exchanger to be connected to the secondary tempering system.

Further, by using a liquid-tight housing, a plurality of thermally independent battery modules may be electrically connected to each other so as to form a battery system. The plurality of thermally independent battery modules may be connected to the secondary tempering system. This may allow for individual temperature control of each of the plurality of battery modules, such that temperature differences between said modules may be minimized or—intentionally—caused.

Still further, by separating the inner primary tempering system from the secondary tempering system regarding respective tempering fluids, a common second tempering fluid not exhibiting specific electrical characteristics may be utilized. Specifically, the second tempering fluid may not be required to be a dielectric, because it is not in contact with the battery cells, in particular the pole sections thereof.

In an embodiment, the battery module further comprises a pump arranged on an outside of the liquid-tight housing and connected to an interior of the liquid-tight housing via first fluid channels of the liquid-tight housing. The pump is configured to generate a flow of the first tempering fluid within the liquid-tight housing by pumping the first tempering fluid through the first fluid channels.

That is, a flow of the first tempering fluid may be actively established within the liquid-tight housing by the pump. The first fluid channels of the liquid-tight housing may be spatially separated from the flow of the second tempering fluid within the walls of the liquid-tight housing. In other words, the first tempering fluid and the second tempering fluid do not mix with each other. The inner tempering circle (the pump, the first channels, the interior of the liquid-tight housing) is spatially separated from the secondary tempering circle (the external tempering system, the flow of the second tempering fluid within the walls of the liquid-tight housing).

Within the liquid-tight housing, the flow of the first tempering fluid may be guided, for instance, by dedicated channels, which may be formed by the arrangement of the battery cells with respect to the housing. That is, the flow of the first tempering fluid may be determined by the particular arrangement of the battery cells rather than by dedicated tubes or pipes. In other words, said channels may not be formed by dedicated physical conduits, pipes or tubes, but by the configuration of the space within the liquid tight housing not occupied by physical solid components like battery cells, sensors, housing portions, holders, wires, other electrical connection means, and the like.

With this setup, the temperature homogeneity within the battery module may be increased and, further, the heat transfer between the battery cells and the housing may be improved.

In an embodiment, the liquid-tight housing, the pump and the first fluid channels form a material closed system of the first tempering fluid.

That is, the first tempering fluid is enclosed within the space provided by the liquid-tight housing, the first fluid channels and the inner space of the pump. In other words, an exchange of material (e.g. the first tempering fluid) between the inner system (e.g. the interior of the liquid-tight housing, the first fluid channels and the interior of the pump) and the exterior of the battery module is prevented, whereas an exchange of thermal energy, i.e. heat, may occur.

In an embodiment, the liquid-tight housing comprises a second fluid channel for the flow of the second tempering fluid.

That is, the liquid-tight housing may be constructed to allow for the flow of the second tempering fluid between the inner surface of the liquid-tight housing and the outer surface of the liquid-tight housing by providing a second fluid channel. In other words, the second flow channel is formed within walls of the liquid-tight housing. The liquid-tight housing may also comprise a plurality of second flow channels. The second flow channel is not in fluid connection with the interior of the battery module, the first flow channels or the pump.

In an embodiment, the second fluid channel protrudes into an interior of the liquid-tight housing.

That is, the inner surface of the liquid-tight housing, which is in thermal contact with the first tempering fluid, exhibits a structured, non-flat surface. For instance, the inner surface may exhibit a rippled or grooved surface. The inner surface may have grooves and ridges. For example, the course of the second fluid channel may correspond or coincide with the course of a respective ridge of the inner surface. For example, the ridge and the second flow channel may be arranged so that the second flow channel is located within the respective ridge. It may be the particular advantage of the inner surface exhibiting a non-flat surface that the area in thermal contact with the first tempering fluid is increased. Thereby, the heat transfer rate between the first tempering fluid and the second tempering fluid, via the wall of the channel is improved, leading to a higher cooling/heating efficiency.

For example, the second fluid channel has a circular cross section.

The cross section of the second fluid channel may be elliptical, rectangular, or the like. Further, the second fluid channel may exhibit a portion with a circular cross section and a portion having a different cross section.

In an embodiment, the second fluid channel extends in a direction of a main axis of the battery module.

The main axis of the battery module may be an axis extending in a predetermined direction with respect to the housing. For instance, the main axis may be a principle axis of the battery module. For instance, the main axis may extend in a direction corresponding to a direction of a maximum or minimum physical size of the battery module or the liquid-tight housing. For instance, the main axis may extend in a direction corresponding to a direction of a (discrete) rotational symmetry axis of highest or lowest order of the battery module or the liquid-tight housing. In a case where the liquid-tight housing is substantially box-shaped, the main axis of the battery module may extend in a direction perpendicular to a side surface of a (notional) circumscribing box.

According to an aspect, the liquid-tight housing comprises a profile housing, a first end plate and a second end plate. The profile housing has two open end sides, which are located opposite to each other along a main axis of the battery module. The first end plate and the second end plate liquid-tightly close the profile housing at the two open end sides.

A profile housing may be a housing portion, which is box shaped or substantially box-shaped having two open sides opposite to each other and four wall portions arranged so as to have a rectangular or substantially rectangular cross section. The main axis of the battery module may extend in a direction from the first open side to the second open side of the profile housing. The profile housing may comprise grooves and/or ridges at an outer and/or inner surface of one or more side portions. The grooves may extend in a direction of the main axis of the battery module. The first and the second end plates are attached to the profile housing so as to close the open sides of the profile housing in a liquid-tight manner. Thereby, the interior of the battery module is sealed against leakage of the first tempering fluid at contact points or areas.

In an embodiment, the battery module comprises a first seal arranged circumferentially between the first end plate and the profile housing and a second seal arranged circumferentially between the second end plate and the profile housing.

That is, the first and second end plates may be attached to the profile housing, wherein at a contact area between the end plates and the profile housing, a seal is provided. The seal extends circumferentially substantially according to the cross section of the profile housing.

For example, the first seal and the second seal are flat seals.

In an embodiment, the first seal and the second seal are each arranged in a plane perpendicular to the main axis of the battery module.

In an embodiment, the profile housing is configured as a double-walled profile housing, wherein a second fluid channel is integrally formed.

In other words, the profile housing comprises an outer wall and an inner wall portion, such that the second fluid channel is integrally formed therebetween.

In an embodiment, the profile housing is made of a material with a thermal conductivity of 50 W/(m·K) or higher.

A thermal conductivity above 50 W/(m·K) or higher may allow for an improved heat transfer between the first tempering fluid and the second tempering fluid through the liquid-tight housing. The profile housing may be made of a material with a thermal conductivity of 100 W/(m·K) or higher, alternatively of 150 W/(m·K) or higher, alternatively of 200 W/(m·K) or higher, alternatively of 300 W/(m·K) or higher, alternatively of 400 W/(m·K) or higher.

For example, the profile housing is made of aluminium. The profile housing may be made of another material like gold, silver, titanium, steel, copper or the like. For instance, the profile housing may be made of a metal.

In an embodiment, the first end plate and/or the second end plate is made of a synthetic material.

For instance, the first end plate and/or the second end plate is made of plastic or glass-fibre reinforced plastic. For instance, the first end plate and/or the second end plate may be made of another material like Acrylnitril-Butadien-Styrol-Copolymer (ABS), Nylon 12 (polyamide 12, PA 12), or the like.

In an embodiment, the liquid-tight housing is partially filled with a gas.

In other words, the liquid-tight housing may not be entirely filled (besides the included physical solid components as the battery cells, connecting means, and the like) with the first tempering fluid, but also includes a certain amount of gas. This allows for the first tempering fluid to change in volume, for instance due to a change in temperature, without the pressure within the liquid-tight housing increasing/decreasing to a large extent.

For instance, the liquid-tight housing may be partially filled with air, nitrogen, or an inert gas like a noble gas (e.g. helium, neon, argon, krypton, xenon).

For example, a volume percentage of the liquid-tight housing filled by the gas is 5% or lower.

For example, the volume percentage may be 10% or lower, 5% or lower, 4% or lower, 3% or lower or 1% or lower. For example, the volume percentage may be a predetermined percentage (e.g. 0.1%, 0.2%, 1% or the like) or higher. For example, the volume percentage may be between 0.1% and 1%, between 1% and 2%, between 2% and 3%, between 3% and 4%, between 4% and 5%, or the like. Said volume percentages may relate to volume percentages with respect to the total volume of the interior of the liquid-tight housing at a predetermined temperature, for instance 298.15 K (25° C.).

For example, the ratio of the volume of the gas and the volume of the first tempering fluid at the predetermined temperature may be equal to or below 1%, 2%, 3%, 4%, 5%, 10% or 15% or the like. The ratio of the volume of the gas and the volume of the first tempering fluid at the predetermined temperature may be above a predetermined percentage (e.g. 0.1%, 0.2%, 1% or the like).

In an embodiment, the liquid-tight housing is pressure tight.

That is, the liquid-tight housing may be constructed so as to prevent a gas from entering or escaping the liquid-tight housing.

For example, the liquid-tight housing is pressure-tight up to a positive pressure of at least 1 bar.

For example, the liquid-tight housing is pressure-tight down to a negative pressure of at least 1 bar.

A positive pressure is a pressure difference between an exterior of the liquid-tight housing and an interior of the liquid-tight housing, wherein the pressure outside the liquid tight-housing is less than the pressure within the liquid tight housing. A negative pressure is a pressure difference between an interior of the liquid-tight housing and an exterior of the liquid-tight housing, wherein the pressure outside the liquid tight-housing is higher than the pressure within the liquid tight housing. 1 bar is 105 Pa and, thus, roughly corresponds to the normal atmospheric pressure.

For instance, the liquid-tight housing may exhibit a leakage rate equal to or below a predetermined threshold. For instance, the liquid-tight housing may exhibit a leakage rate equal to or below $10^{-2}$ mbar·l/s, $10^{-3}$ mbar·l/s, $10^{-4}$ mbar·l/s, $10^{-5}$ mbar·l/s or $10^{-6}$ mbar·l/s.

In an embodiment, the battery module further comprises a plurality of cell holders including half-shell shaped portions configured to hold the plurality of battery cells. Lateral surfaces of the plurality of battery cells are covered by the half-shell shaped portions.

That is, the battery cells are held by the cell holders of the battery module, wherein the lateral surfaces of the battery cells are covered entirely or to a large extent (for example more than 95%, more than 90%). In the case of cylindrically shaped battery cells having an outer shell at the side and two poles located at the top and bottom bases, the half-shell shaped portions of the cell holders have a substantially half-circle shaped cross section. The battery module is not limited thereto and the half-shell shaped portion may have a cross section corresponding to the shape of the battery cells. That is, for instance, in a case of non-cylindrical shaped battery cells, the half-shell shaped portion may be non-circular, but correspond to the shape of the battery cells. Further, a shape of an inner surface of the half-shell shaped portion, which is in contact with a battery cell may correspond to the shape of the battery cell, whereas a shape of an outer surface of the half-shell shaped portion may be different from the shape of the battery. Each battery cell bay be held between two half-shell shaped portions, which are in positive contact. For instance, a thickness of each half-shell shaped portion may be above a predetermined threshold.

With this setup, the first tempering fluid may be preferentially directed along the poles of the battery cells, where the heat is mainly generated. Further, by providing the cell holders having a certain thickness, the volume of the space of the first tempering fluid is reduced. Thereby, the weight of the battery module may be reduced. Further, the heat transfer from the battery cells via the first tempering fluid and the liquid-tight housing to the second tempering fluid may be improved.

In an embodiment, each battery cell is electrically connected to one or more other battery cells in parallel or series so as to form a battery stack.

In other words, the plurality of battery cells may include subsets of battery cells, wherein the battery cells of each subset are connected to each other in parallel. Further, the subsets of battery cells are connected to each other in series. Thereby, a battery stack is formed, wherein the overall voltage provided by the battery stack is determined by the number of subsets connected in series and the type of battery cells used.

In an embodiment, the battery module comprises an electrical feedthrough connected to the battery stack.

The electrical feedthrough may provide an electric connection with the battery stack through the liquid-tight housing. The battery module may comprise two electrical feedthroughs as a positive and a negative terminal of the battery module.

According to another aspect, the present invention relates to a battery system. The battery system comprises a battery module according to any one of above aspects and variations thereof and a secondary tempering system. The secondary tempering system is connected to the liquid-tight housing of the battery module and is configured to establish the flow of the second tempering fluid.

In other words, the battery system comprises the battery module, which includes a primary tempering system, e.g. the first tempering fluid, which is in thermal contact with the battery cells and the inner surface of the liquid-tight housing, and the secondary tempering system. The liquid-tight housing acts as a heat exchanger for exchanging heat between the first tempering fluid and the second tempering fluid. Specifically, heat may be transferred from the battery cells to the first tempering fluid and via the liquid-tight housing to the second tempering fluid. The heat absorbed by the second tempering fluid may then be dissipated by a dedicated heat dissipation means of the secondary tempering system, which might be a second heat exchanger for exchanging heat between the second tempering fluid and a heat reservoir, which may be the ambient air. Similarly, heat may be transferred into the battery module by heating the second tempering fluid by dedicated heating means of the secondary tempering system.

In an embodiment, the first tempering fluid differs from the second tempering fluid.

For instance, the first tempering fluid may be a tempering fluid, which is electrically isolating. The second tempering fluid is not necessarily required to be electrically isolating, as it does not come in contact with the poles and/or electrical connection means within the liquid-tight housing of the battery module. For example, the second tempering fluid may be a mixture of water and glycol.

The battery system of the present invention provides improved temperature control capabilities, homogeneous cooling of the battery cells within the battery module, reduction of the weight of the battery module and/or improved system flexibility by an internal tempering system, which may be thermally coupled with a secondary tempering system by allowing a flow of a second tempering fluid between the inner and the outer surface of the housing.

Additional benefits and advantages of the invention will become apparent from the detailed description of an embodiment and the drawings.

BRIEF DESCRIPTION OF THE DRAWINGS

The foregoing aspects and many of the attendant advantages will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In the following, one embodiment will be described in detail through reference to the drawings.

Figure 1:
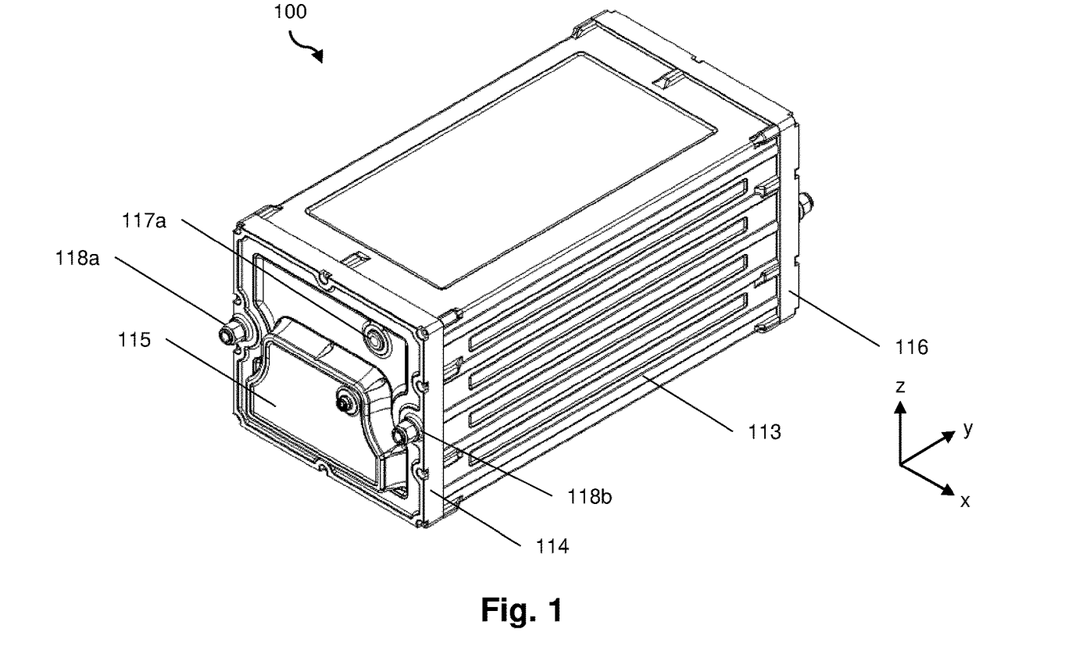
FIG. 1 is an illustration of an external view of a battery module.
Figure 2:
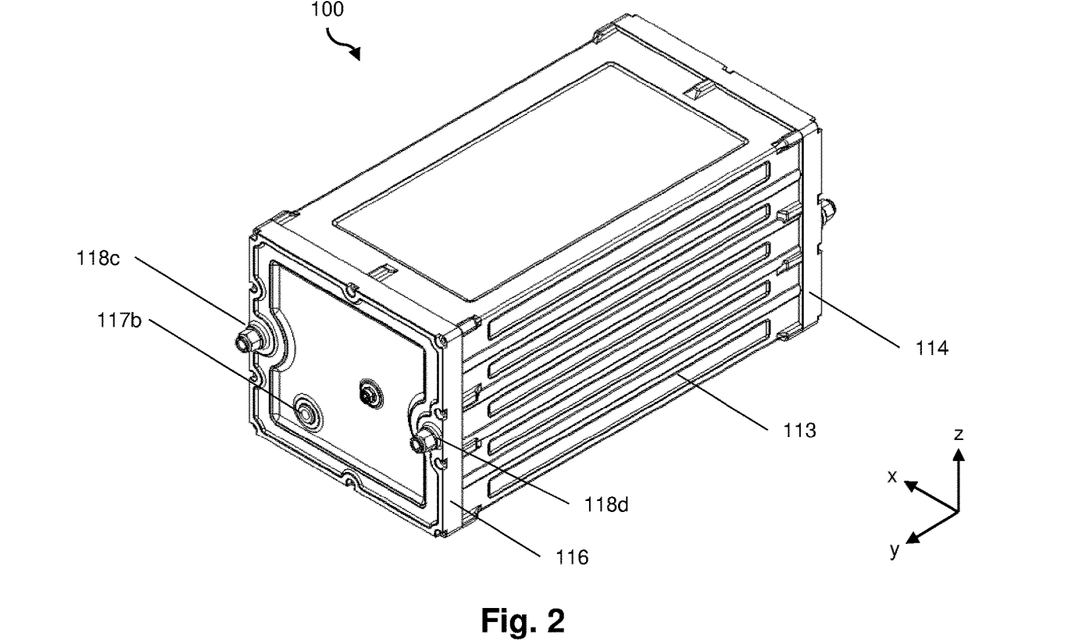
FIG. 2 is an illustration of an external view of the battery module.

FIG. 1 and FIG. 2 are illustrations of an external view of a battery module 100 when viewed from different directions. The battery module comprises a liquid-tight housing 110, which itself comprises a first end plate 114, a profile housing 113 and a second end plate 116. Further, the battery module 100 comprises a pump cover 115, two electrical feedthroughs 117a, 117b and four ports 118a-d for connection with a secondary tempering system.

The liquid-tight housing 110 has the substantial shape of a rectangular cuboid, wherein two sides opposite to each other are formed by the first end plate 114 and the second end plate 116 and the remaining four sides are formed by the profile housing 113. The pump cover 115 is arranged on an outside surface of the first end plate 114 and covers a pump 130 attached to an outer side of the first end plate 114. Between the first end plate 114 and the profile housing 113 as well as between the second end plate 116 and the profile housing 113, a flat seal is provided to close the housing 110 in a liquid-tight manner. The flat seals circumferentially surround the open end sides of the profile housing 113.

The liquid-tight housing 110 accommodates a plurality of battery cells 120 connected to each other so as to form a battery stack. Details thereon are described further below. Further, a first tempering fluid is included in the liquid-tight housing 110. The first tempering fluid is a dielectric fluid with and may have a high thermal conductivity.

The profile housing 113 is substantially box-shaped with two open sides opposite to each other. The profile housing 113 is made of aluminium and, hence, exhibits a high thermal conductivity. However, the material of the housing is not limited to aluminium and may be made of another material having a thermal conductivity of 50 W/(K·m) or higher, alternatively of 100 W/(K·m) or higher, alternatively of 150 W/(K·m) or higher, alternatively of 200 W/(K·m) or higher.

The profile housing 113 comprises grooves and/or ridges on two opposing outer sides. However, the profile housing 113 is not limited to having grooves and/or ridges on two opposing sides. The profile housing 113 may have grooves and/or ridges on only one side, two sides, three sides or all four sides. In the battery module 100 illustrated in FIG. 1 and FIG. 2, the grooves and/or ridges extend in a direction of a main axis (y-axis) of the battery module 100. The direction of the main axis extends along the direction of maximum physical size of the profile housing 113.

The profile housing 113 further comprises thread holes on a front and back side for mounting the first end plate 114 and the second end plate 116 thereto in a liquid-tight manner.

The first end plate 114 and the second end plate 116 are substantially of a flat rectangular shape. The substantially rectangular shape of the first and second end plates 114, 116 corresponds to the shape of the cross section of the profile housing 113. The first and second end plates 114, 116 comprise screw holes at positions corresponding to the positions of the thread holes of the profile housing 113.

The first end plate 114 is mounted to one of the open end sides of the profile housing 113 by a plurality of screws inserted to the screw holes of the first end plate 114 and corresponding thread holes of the profile housing 113. The second end plate 116 is mounted to the other one of the open end sides of the profile housing 113 by a plurality of screws inserted to the screw holes of the second end plate 116 and corresponding thread holes of the profile housing 113. The attachment of the end plates 114, 116 to the profile housing 113 is not limited to being realized using screws and corresponding screw holes and thread holes, but may be realized using different attachment means like, for instance, bolts and nuts.

The electrical feedthroughs 117a, 117b are connected to battery cells 120 included in the interior of the liquid-tight housing 110. Specifically one of the electrical feedthroughs 117a, 117b is connected to a plus pole of a battery stack formed by the plurality of battery cells 120 in the battery module 100. The other one of the electrical feedthroughs 117a, 117b is connected to a minus pole of the battery stack inside the battery module 100. That is, a voltage of the battery module 100 is accessible from the outside via the electrical feedthroughs 117a, 117b. The electrical feedthroughs 117a, 117b providing the electrical connection to the battery cells 120 are arranged in respective sealed holes within the first and second end plates 114, 116. However, the electric feedthroughs 117a, 117b may also be provided in the profile housing 113.

On each of the first and second end plates 114, 116, two ports 118a-d for connection with a secondary tempering system are provided. Details on the secondary tempering system are provided further below.

Figure 3:
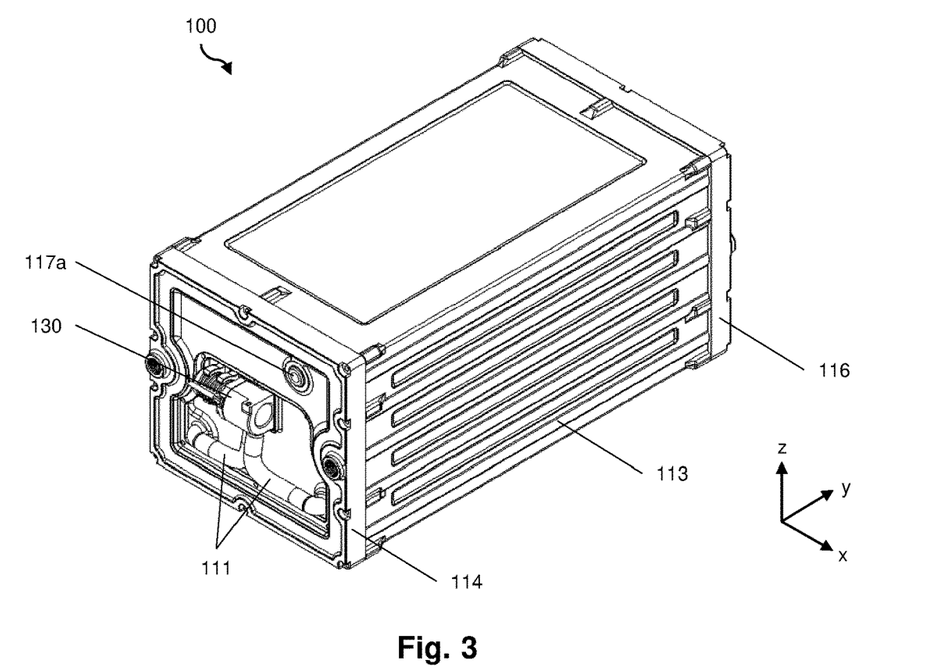
FIG. 3 is an external view of the battery module, wherein a cover is not illustrated.

FIG. 3 is an external view of the battery module 100, wherein the pump cover 115 is not illustrated. The battery module 100 comprises a pump 130 attached to an outer surface of the first end plate 114. The pump 130 may be a micropump, which is connected to an interior of the liquid-tight housing 110 via first fluid channels 111. The pump 130 is configured to pump the first tempering fluid through the first fluid channels 111. Thereby, a flow of the first tempering fluid is established within the liquid-tight housing 110.

Figure 4:
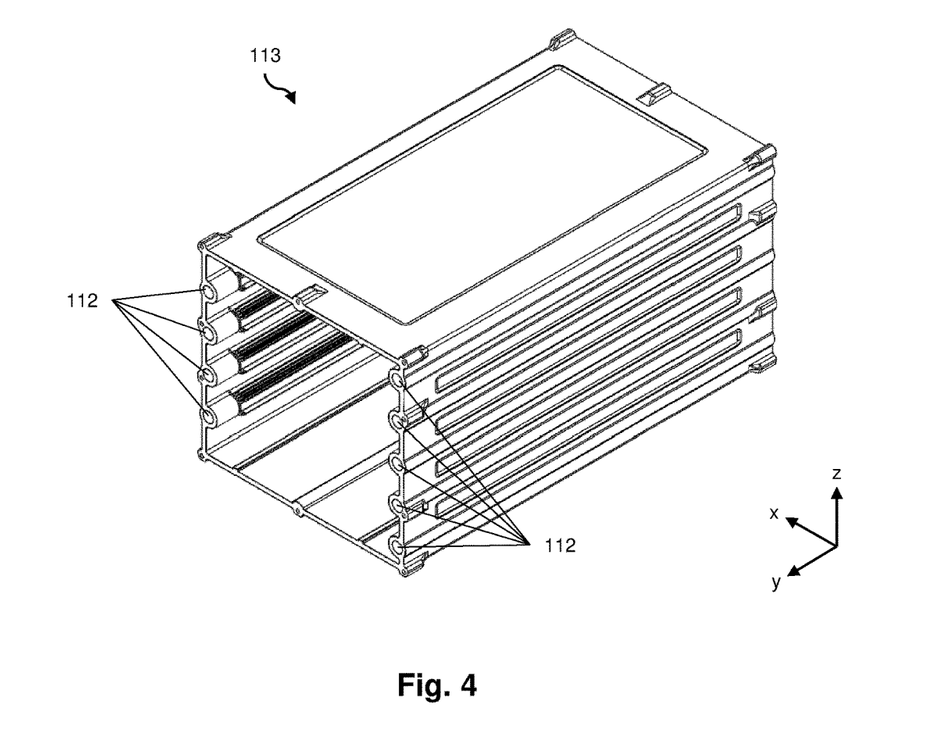
FIG. 4 is an illustration of a profile housing of the battery module.

FIG. 4 is an illustration of a profile housing 113. The profile housing 113 comprises a plurality of second fluid channels 112, which are integrally formed with the profile housing 113 between an inner surface and an outer surface of the profile housing 113. The second fluid channels 112 have a circular cross section and protrude into an interior of the profile housing 113. Thereby, the area in contact with the first tempering fluid within the profile housing 113 is increased, leading to an improvement of the heat transfer rate between the first tempering fluid and a second tempering fluid within the plurality of second fluid channels 112. As the second tempering fluid is not in contact with the battery cells 120, it is not required to be a dielectric, but may be, for instance, a common tempering fluid like a mixture of water and glycol.

Although the profile housing 113 illustrated in FIG. 4 comprises nine straight second fluid channels 112 on two opposite sides and extending in a direction of the main axis y of the battery module 100, the profile housing 113 is not limited thereto. In particular, the profile housing 113 may comprise a different number of second fluid channels 112. Further, second fluid channels 112 may be provided on one, two, three or four sides of the profile housing 113. Further, the second fluid channels may be curved or meandering. Further, the cross section may be elliptical, rectangular, or the like.

Figure 5:
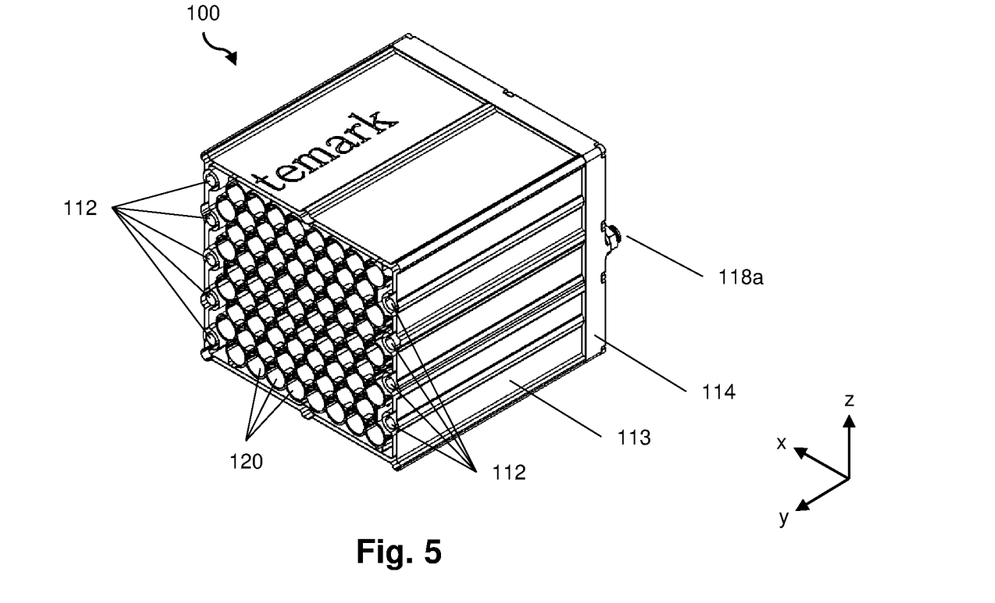
FIG. 5 is a cut-out illustration of the basic arrangement of the battery cells within the battery module.

FIG. 5 is a cut-out illustration of the basic arrangement of the battery cells 120 within the battery module 100. The battery module 100 comprises a plurality of battery cells 120 within the liquid-tight housing 110. The battery cells 120 may be of lithium-ion, Nickel Cadmium, Nickel metal hydride, lead acid, polymer-based type or of any other type. The battery cells 120 have a cylindrical shape with their poles arranged at the opposing circular sides thereof. The battery cells 120 are arranged such that the circular sides are perpendicular to the main axis y of the battery module 100. The battery cells 120 are hexagonally arranged with respect to each other when viewed along the y axis.

Figure 6:
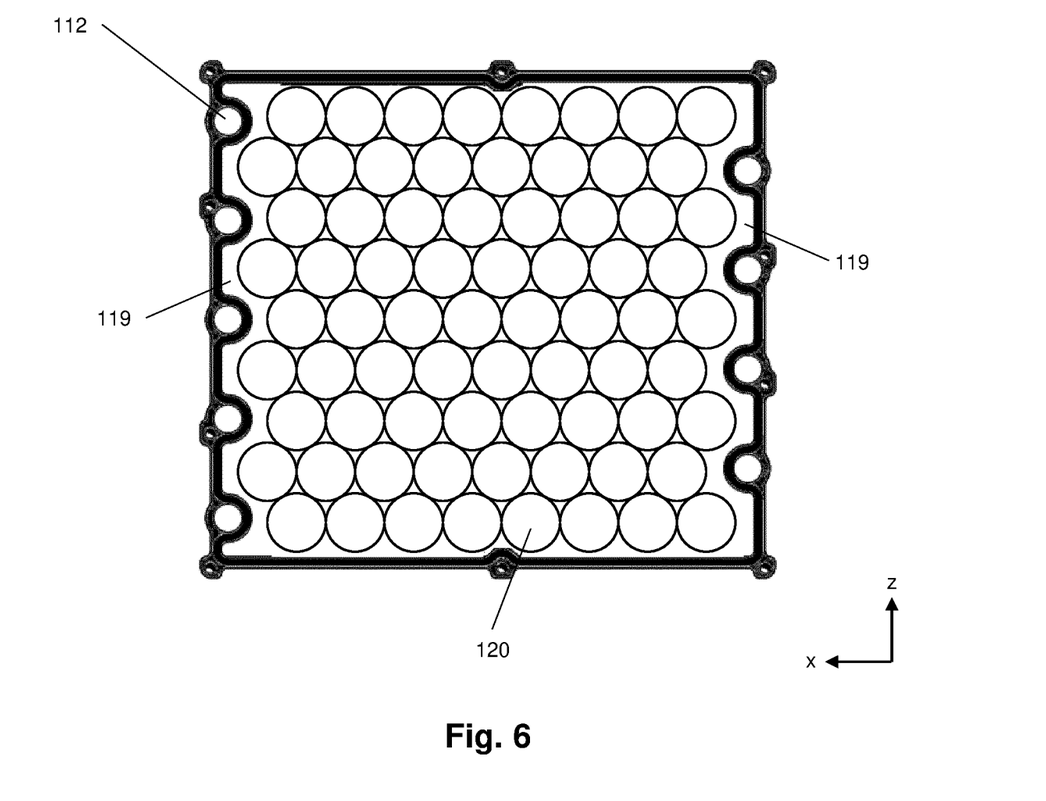
FIG. 6 is a cross-sectional view of the arrangement of the battery cells within the profile housing.

FIG. 6 is a cross-sectional view of the arrangement of the battery cells 120 within the profile housing 113. In the figure, the battery cells 120 and the second fluid channels 112 are indicated only exemplarily. The battery cells 120 are arranged in a dense hexagonal arrangement, wherein a distance between battery cells 120 adjacent to two opposite side surfaces of the profile housing 130, which comprise the second fluid channels 112, is larger than the distance between adjacent battery cells 120 and a distance between the battery cells 120 and an inner surface of the two other sides of the profile housing 113. With this arrangement, spaces 119 not occupied by battery cells 120 are formed on opposite sides of the battery module 100 for guiding the flow of the first tempering fluid through the liquid-tight housing 110. However, the arrangement of the battery cells 120 is not limited to being a hexagonal arrangement, and may be different. For instance the battery cells may be arranged according to a rectangular or square arrangement.

The first channels 111 of the first end plate 114 connect the pump 130 to an interior of the battery module 100 at positions corresponding to the locations of the spaces 119. With this arrangement, a flow of the first tempering fluid may be established by the pump 130 around the battery cells 120 in an x-direction in a parallel manner.

Figure 7:
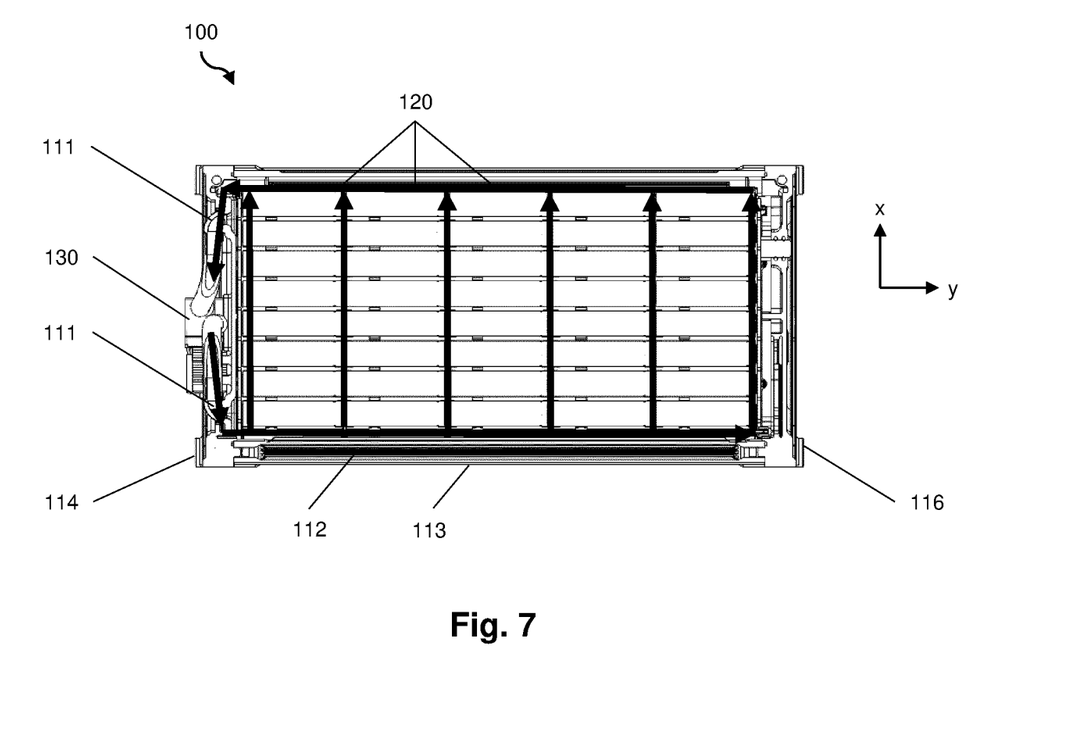
FIG. 7 illustrates a flow of a first tempering fluid within a battery module.

FIG. 7 illustrates said flow of the first tempering fluid by bold arrows. The first tempering fluid is pumped by the pump 130 through the first fluid channel 111 into the interior of the liquid-tight housing 110 at a position corresponding to a position of a space 190. The space 190 exhibits, due to its comparably large cross section, a comparably small flow resistance in the y-direction, such that the first tempering fluid flows around the battery cells 120 in a parallel manner in the x-direction. Afterwards, the first tempering fluid enters the other space 190 at the opposite side and again enters the pump 130 via the first fluid channel 111.

The first and the second end plate 114, 116 comprise second fluid channels, which connect the second flow channels 112 of the profile housing 113 with the ports 118. That is, the second fluid channels 112 on a side of the profile housing 113 are merged in the second fluid channels of the end plates 114, 116 and lead to a joint port 118 for connection with a secondary tempering system.

Figure 8:
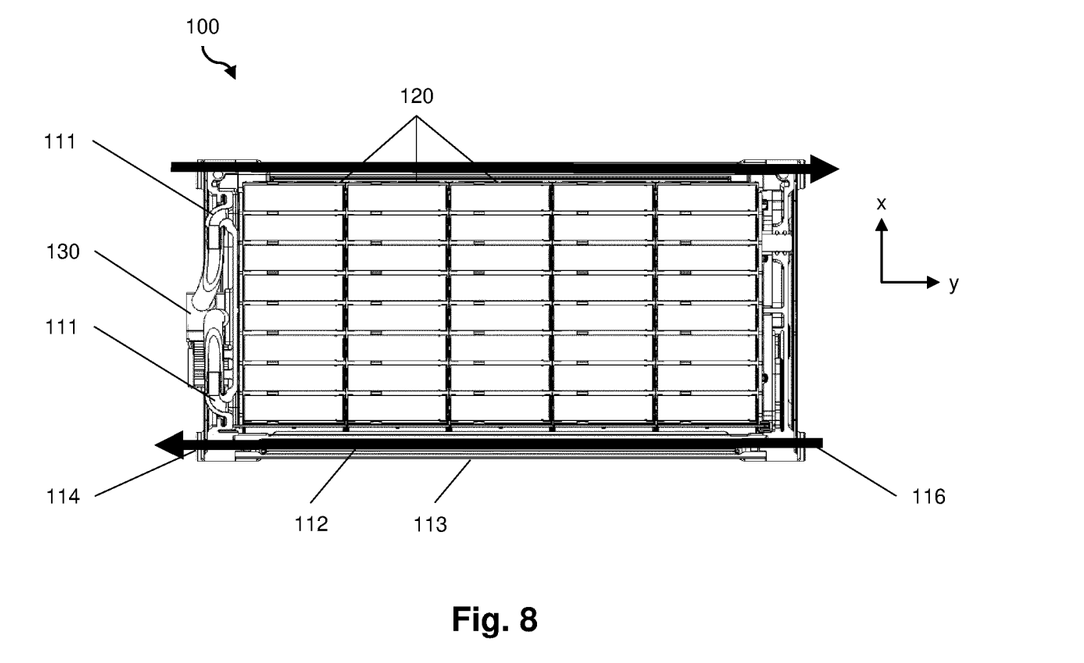
FIG. 8 illustrates a flow of a second tempering fluid within a housing of the battery module.
Figure 9:
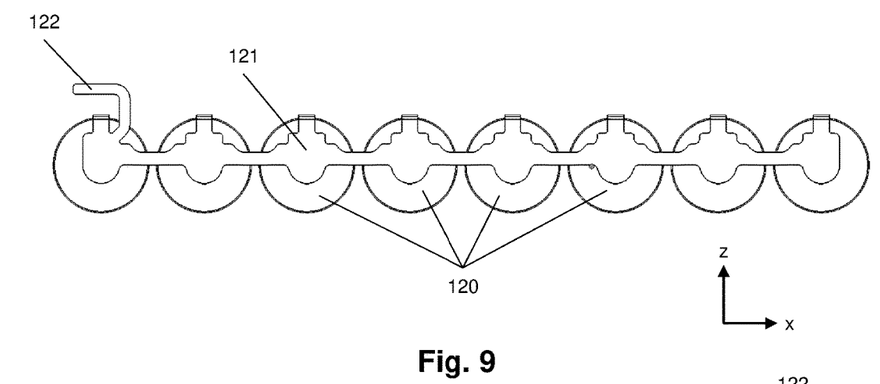
FIGS. 9 to 12 illustrate an exemplary electrical connection of a plurality of battery cells in parallel, viewed from different directions.
Figure 10:
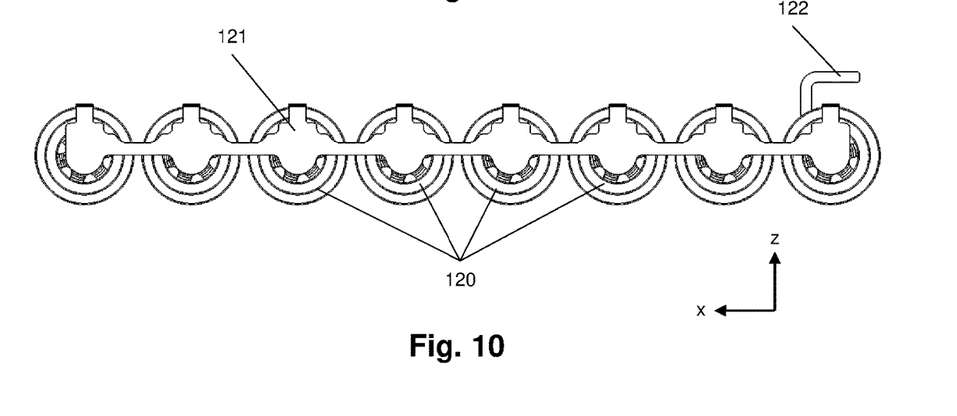
Figure 11:
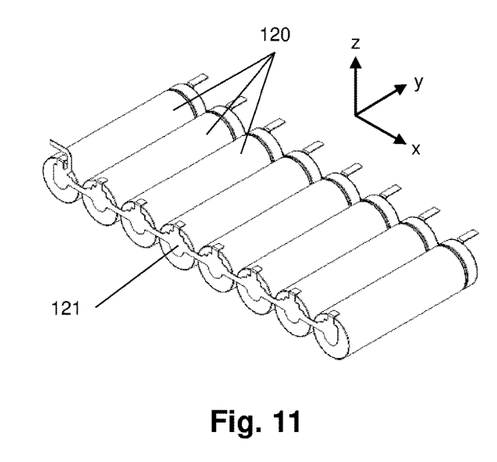
Figure 12:
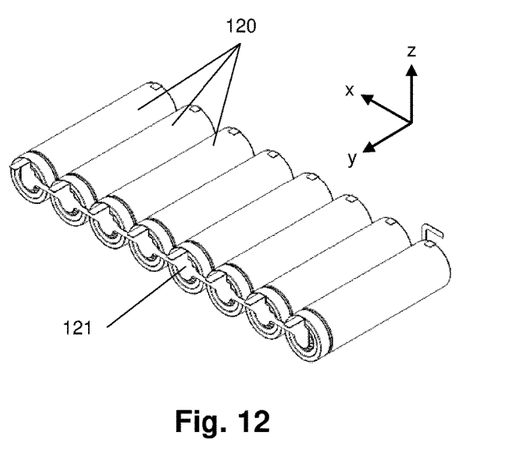

FIG. 8 illustrates said flow of the second tempering fluid of the secondary tempering system by bold arrows. The second tempering fluid is pumped through a port 118, the second fluid channels of an end plate, the second fluid channel 112 of the profile housing 113, the second fluid channel of the other end plate and through another port 118 out of the battery module 100.

As illustrated in FIG. 7 and FIG. 8, the flow of the first tempering fluid within the spaces 119 is directed in a direction opposite to the flow of the second tempering fluid within the second fluid channels 112 of the profile housing 113. Thereby, the thermal coupling between the first tempering fluid and the second tempering fluid is optimized.

That is, the liquid-tight housing 110 acts as a heat exchanger between the first tempering fluid sealed within the liquid-tight housing 110 (including the pump 130 and the first fluid channels 111) and the second tempering fluid of the secondary tempering system.

FIGS. 9 to 12 illustrate an exemplary electrical connection of a plurality of battery cells 120 in parallel, viewed from different directions. The figures show eight battery cells 120 connected to each other in a parallel manner by two electrical connection bars 121. Said electrical connection bars 121 are, for instance, made of a metal. A first connection bar 121 connects the plus poles of the battery cells 120 with each other. A second connection bar 121 connects the minus poles of the battery cells 120 with each other.

The connection bars 121 may be welded to the plus or minus poles of the battery cells 120. For instance, each connection bar 121 may be laser-welded to either one of plus and minus poles of the battery cells 120. The connection bars 121 comprise a terminal portion 122 for a connection with a measurement device like a voltage sensor (not illustrated). It goes without saying that more or less than eight battery cells 120 may be connected to each other in parallel. Further, the electric connection means is not limited to a bar 121, but may be a sheet or the like.

Figure 13:
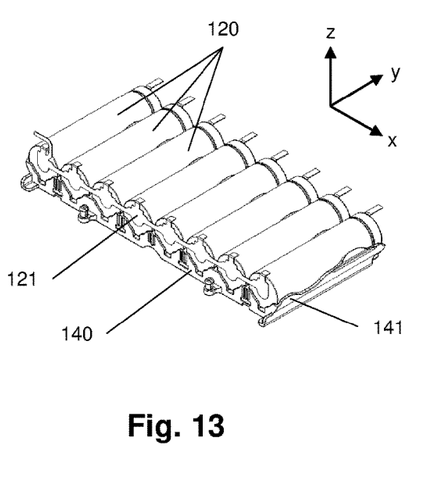
FIGS. 13 and 14 illustrate the electrically connected battery cells held by a cell holder.
Figure 14:
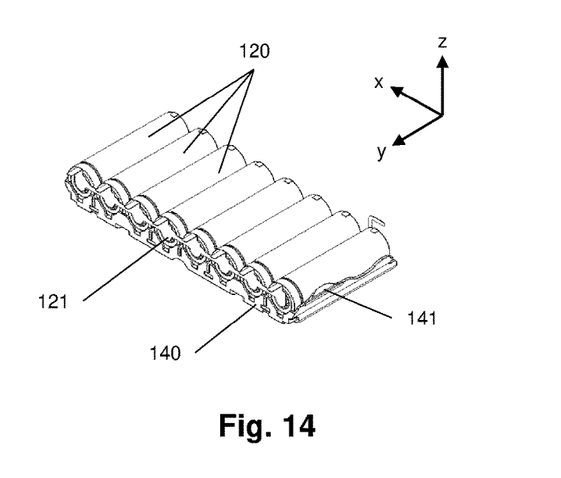

FIGS. 13 and 14 illustrate the electrically connected battery cells 120 of FIGS. 9 to 12, which are held by a cell holder 140. The cell holder 140 comprises a plurality of half-shell shaped portions 141 for respectively holding the plurality of battery cells 120. Specifically, the battery cells 120 are held at the lateral surfaces thereof, leaving the pole sections uncovered. The cell holders 140 may be made of a non-conducting material like a synthetic material as glass-fiber reinforced plastic. The cell holder 140 may comprise mounting portions like screw holes for a connection with the liquid-tight housing 110 and/or another cell holder 140.

The entire or substantially the entire lateral surface of the battery cells 120 is covered by half-shell shaped portions 141 of two cell holders 140. In the figures, only one cell holder 140 is shown for illustration purposes. However, the lateral surfaces of the battery cells 120 are covered by the shown lower cell holder 140 and an upper cell holder, which is not illustrated. The half-shell shaped portions of the lower cell holder 140 and the upper cell holder cover the lateral surface of the battery cells 120 with a positive fit. The cell holders 140 are constructed so as to reduce the volume occupied by the first tempering fluid within the liquid-tight housing 110. For instance, the cell holders may exhibit a thickness above a predetermined threshold.

Figure 15:
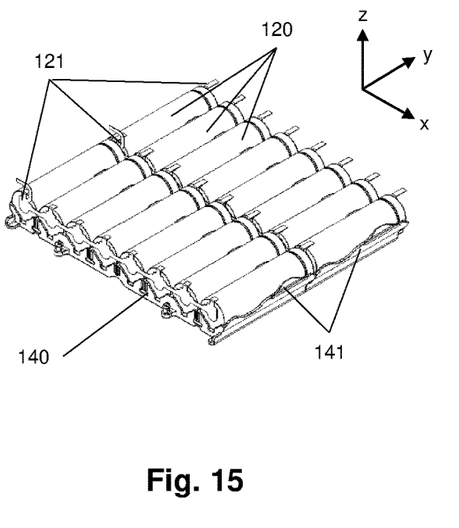
FIGS. 15 and 16 illustrate two sets of parallel connected battery cells with respective cell holders.
Figure 16:
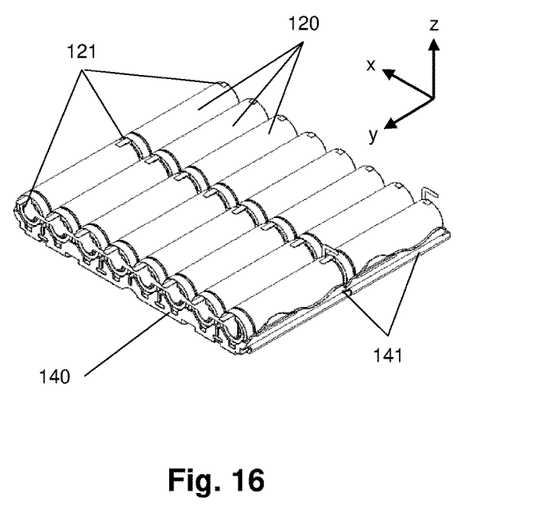

FIGS. 15 and 16 illustrate two sets of parallel connected battery cells 120 with respective cell holders 140, which are connected to each other in series.

Figure 17:
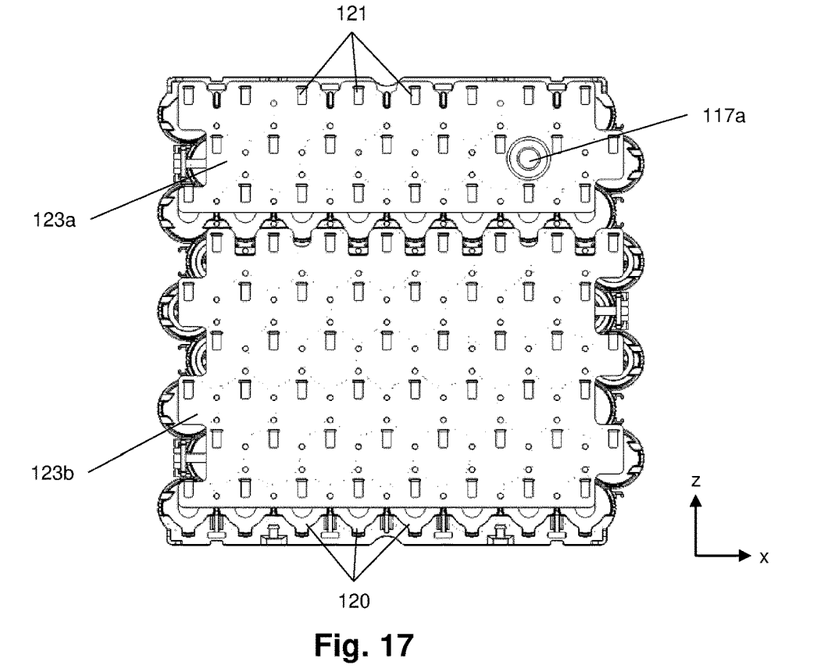
FIGS. 17 and 18 show a battery stack comprising a plurality of battery cells.
Figure 18:
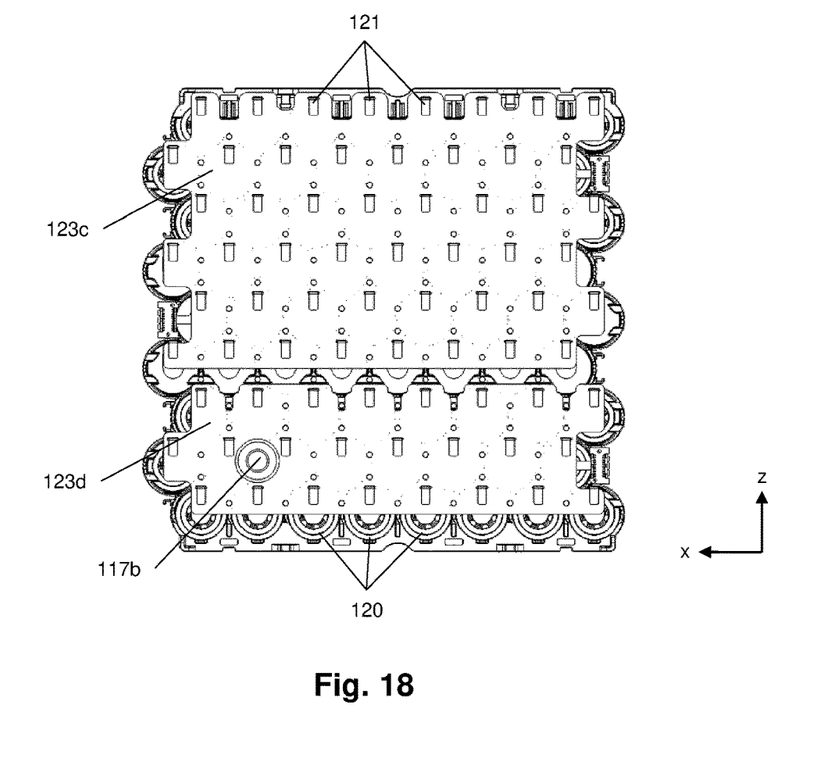
Figure 19:
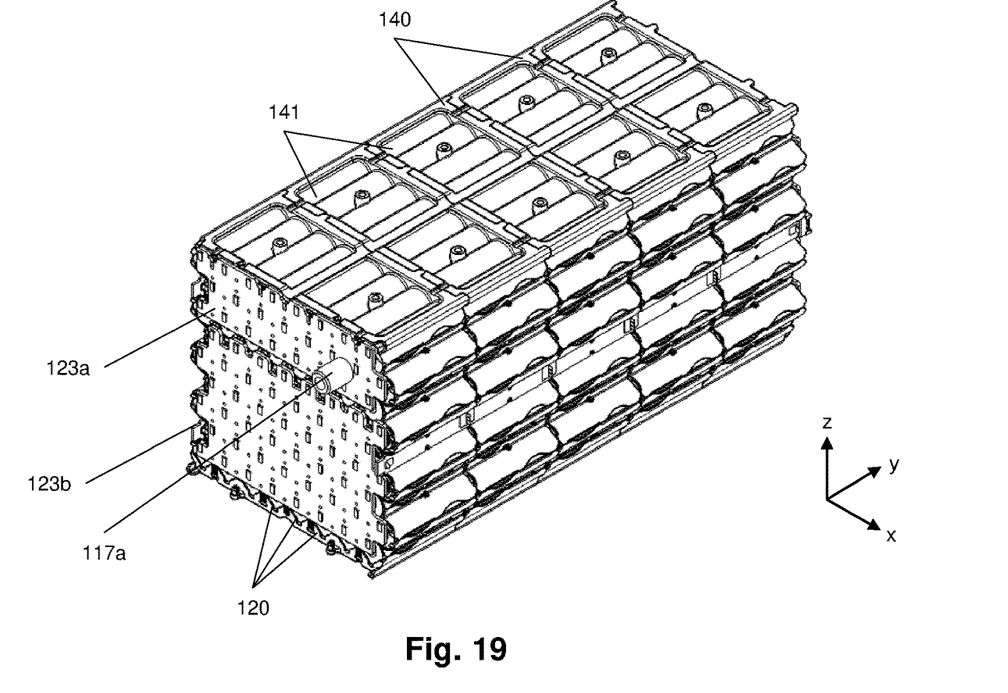
FIGS. 19 and 20 are overview illustrations of the battery stack.
Figure 20:
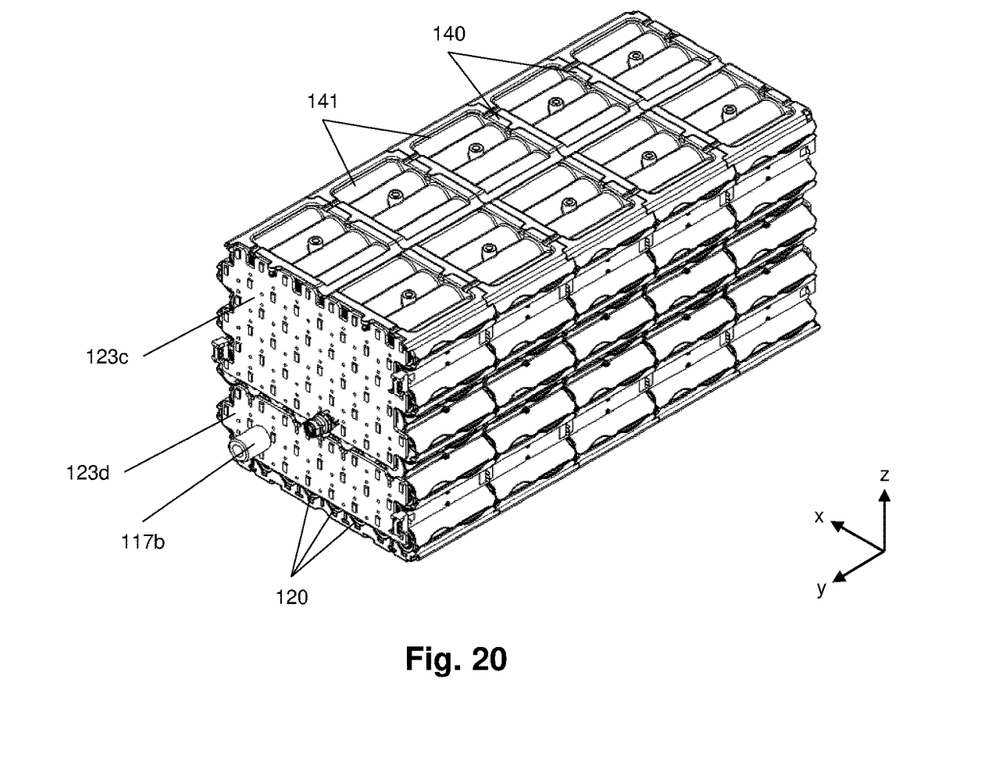

FIGS. 17 and 18 show a battery stack comprising a plurality of battery cells 120 as view from opposite directions along the y-axis. FIGS. 19 and 20 are overview illustrations of the battery stack. The battery cells 120 are connected to each other at a front and a back side corresponding to the open end sides of the profile housing 113 by connection sheets 123a-d.

Specifically, at a side corresponding to the location of the first end plate 114, as illustrated in FIG. 17, the plus poles of three upper rows of battery cells 120 are connected to each other by a first connection sheet 123a. The first connection sheet 123a is connected to the first electrical feedthrough 117a. Further, the minus pole of three inner rows of battery cells 120 and the plus poles of three lower rows of battery cells 120 are connected to each other by a second connection sheet 123b.

At a side corresponding to the location of the second end plate 116, as illustrated in FIG. 18, the minus poles of the three upper rows of battery cells 120 and the plus poles of the three inner rows of battery cells 120 are connected to each other by a third connection sheet 123c. Further, the minus poles of three lower rows of battery cells 120 are connected to each other by a fourth connection sheet 123d. The fourth connection sheet 123d is connected to the second electrical feedthrough 117b.

The battery module 100 and, in particular, the battery stack is not limited to the described setup. In particular, the battery cells 120 may be arranged in a different manner, depending on the type of the battery cells 120, the total voltage and the performance to be achieved.

As described further above, each battery cell 120 is held by two half-shell shaped portions 141 of respective cell holders 140 located below and above the battery cells 120.

Figure 21:
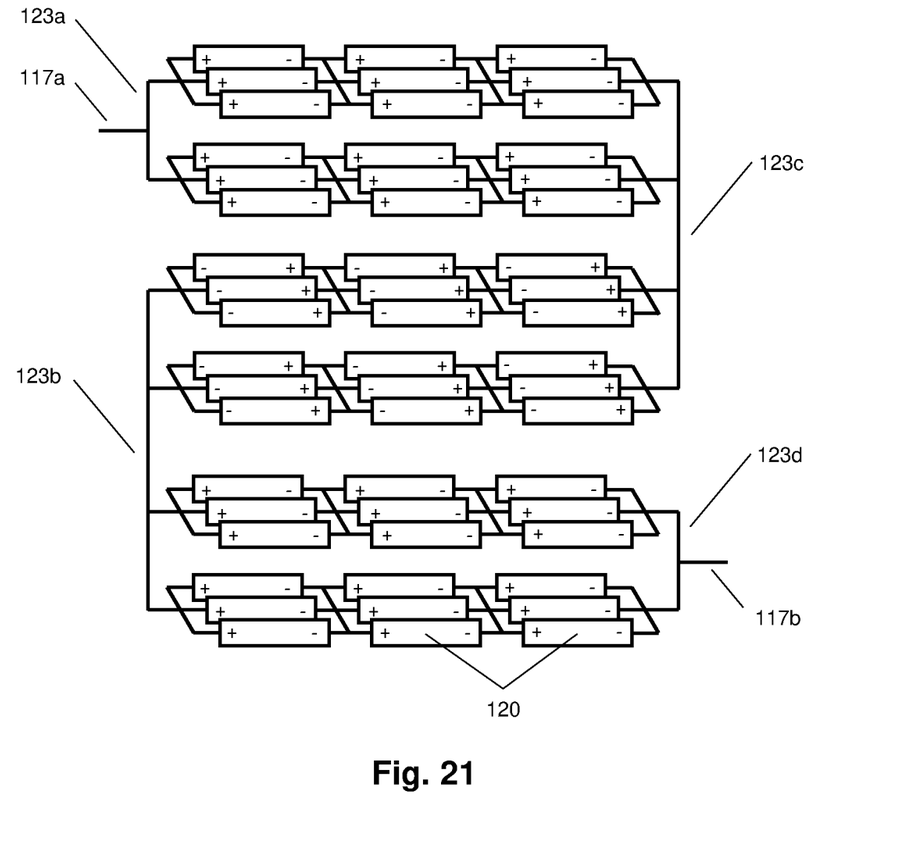
FIG. 21 is a schematic illustration of the electric connection of the battery cells within the battery stack.

FIG. 21 is a schematic illustration of the electric connection of the battery cells 120 within the battery stack. For reasons of clarity and comprehensibility, the battery stack is illustrated as comprising six layers of battery cells 120, wherein each layer comprises nine battery cells 120 connected to each other in parallel or series. The layers are connected to each other by the four connection sheets 123a-d. The voltage of the entire battery stack is provided between the two electrical feedthroughs 117a and 117b. The illustration is a simplified visualization of the connection principal of the battery stack and, hence, the battery module 100 is not limited to the illustrated number of battery cells 120, rows and layers.

Figure 22:
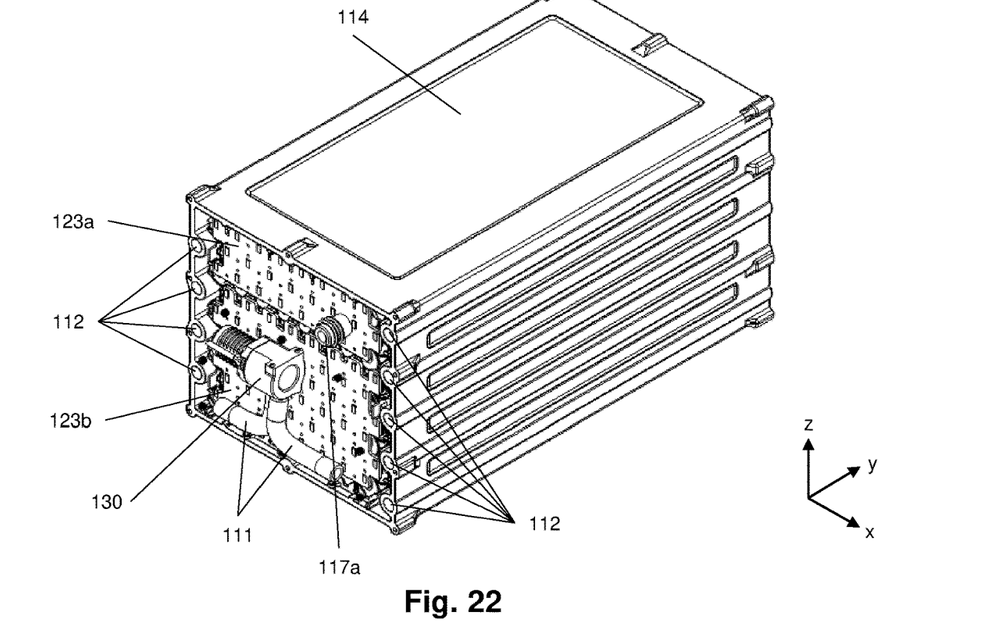
FIGS. 22 and 23 are illustrations of an outer appearance of the battery module.
Figure 23:
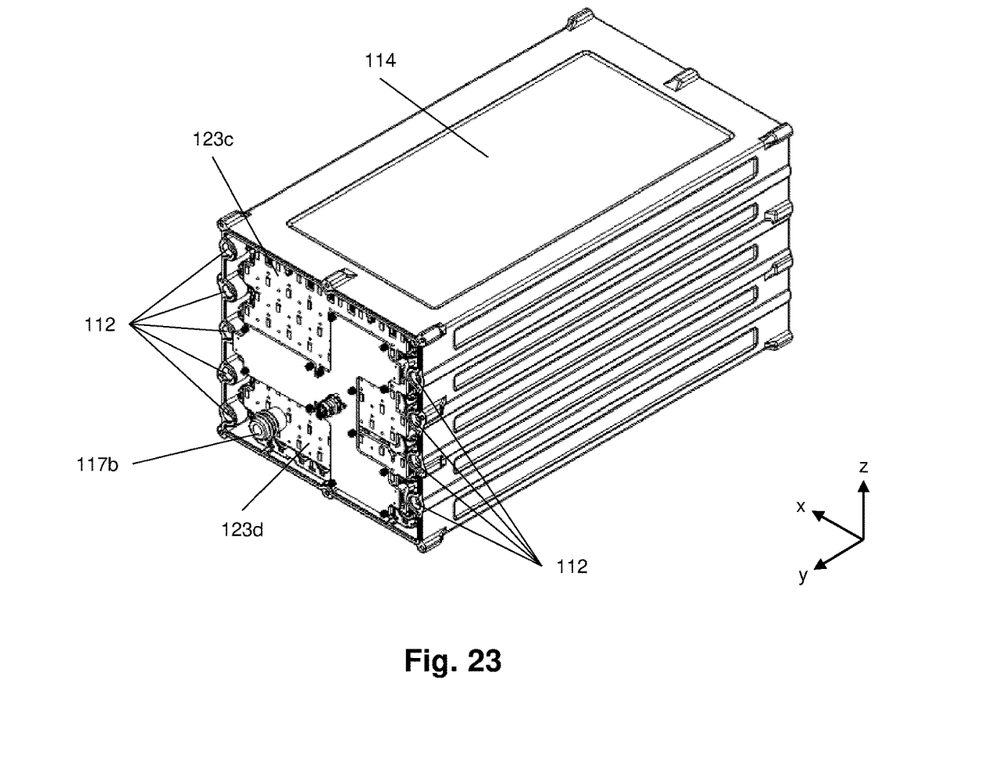

FIGS. 22 and 23 are illustrations of an outer appearance of the battery module 100, wherein the first and second end plates 114, 116 as well as the pump cover 115 are not shown.

During charging of the battery module 100 or in a case where the battery module provides a high current, heat is generated within the battery module 100, mainly at positions of the battery cell poles. Said heat is transferred to the first tempering fluid, which may lead to a change of the volume of the first tempering fluid. When the liquid-tight housing 110 is entirely filled with the first tempering fluid, the pressure within the liquid-tight housing 110 may increase. Thus, the liquid-tight housing 110 is constructed so as to be pressure-tight. For instance, the liquid-tight housing may be pressure-tight up to a positive pressure of 1 bar, 1.5 bars, 2 bars or the like. Similarly, if the temperature of the first tempering fluid decreases, the pressure within the liquid-tight housing 110 may decrease. Hence, the liquid-tight housing is constructed so as to be pressure-tight down to a negative pressure of 1 bar. This may be achieved by utilizing, for instance, a profile housing 113, first and second end plates 114, 116 of sufficient thickness pressure-tightly connected to each other using a sufficient number of screws with adequate seals.

In order to allow for the volume change of the first tempering fluid without an excessive increase/decrease of pressure within the liquid-tight housing 110, the liquid-tight housing 110 may be partially filled with a gas. For instance, the gas may occupy a volume percentage of the interior of the liquid-tight housing up to 1%, 2%, 3%, 4%, 5% or the like. Said voltage percentage may be in a range between any two of said values. The volume percentage may be above a predetermined value (e.g. 0.1%, 0.2%, 1% or the like) Volume percentages may refer to a volume percentages with respect to the volume of the interior of the liquid-tight housing 110 at a given temperature, for instance 298.15 K (25) ° C. Although not limited thereto, the gas included in the liquid-tight housing 110 may be air, for instance.

The battery module 100 may, in addition to the components described above, comprises one or more temperature sensors attached to a battery cell 120, a cell holder 140, an inner surface of the liquid-tight housing 110 or the like, and respective temperature sensing lines for providing temperature sensor signals to an outside of the battery module 100. The battery module 100 may further comprise one or more voltage sensing lines connected, for instance, to a connection bar 121 or a connection sheet 123*a-d* for providing a voltage signal to a voltage sensor outside of the battery module 100. Further, the battery module 100 may comprise one or more current-limiting elements like fuses. The battery module 100 may further comprise a controller like a microprocessor connected to the pump 130. The controller may receive voltage signals from the voltage sensor and/or temperature signals from the temperature sensors. Based on the temperature and/or voltage signals and, for instance, respective set points, the controller controls operation of the pump 130.

A battery system according to an embodiment comprises at least one battery module 100 as described above and a secondary tempering system connected to the ports 119 of the battery modules 100. The tempering system comprises, for instance, a pump, a heat exchanger and fluid pipes for establishing a flow of the second tempering fluid. For instance, the tempering system may be connected to a plurality of battery modules 100. For example, the second tempering fluid may flow through the plurality of battery modules 100 in a parallel or serial manner. The heat exchanger of the tempering system may be configured to exchange heat between the second tempering fluid and a heat sink and/or a heat source. The heat sink or source may be, for instance, ambient air. Further, the tempering system may comprise an electrical heater configured to heat the second tempering fluid in order to allow for temperature control of each of the battery modules 100.

In the following, the concept of the battery module 100 and battery system is summarized.

The core idea of the battery module/system is to design a tempering circuit for a battery module 100 consisting of a plurality of battery cells 120 as a closed system. This means that a defined liquid reservoir (first tempering fluid) is enclosed in an allocated space (the liquid-tight housing 110, the pump 130 and the first fluid channels 111) together with the battery cells 120. The first tempering fluid is made to circulate there and the heat is dissipated from the battery cell poles. Via the first tempering fluid, which is electrically non-conductive but has good thermal conductivity properties, the heat is transferred to the inner wall of the profile housing 113. Second fluid channels 112 are included in the profile housing 113, which are configured to be connected to a secondary tempering system. The profile housing 113 thus forms a heat exchanger in the form of a housing.

Together, the end plates 114, 116 and the profile housing 113 form a closed liquid-tight housing 110. Seals between the end plates 114, 116 and the profile housing 113 ensure that the housing remains tight even at an overpressure of up to 1 bar and that no first tempering fluid can escape.

A pump 130 (a micropump, for instance) is mounted on one of the end plates 114, 116 of the liquid-tight housing 110 and is directly connected to first fluid channels 111 integrated in the end plates 114, 116, so that the first tempering fluid in the liquid-tight housing 110 can be conveyed and circulation can take place. This circulation supports the heat dissipation or heat absorption between the profile housing 113 and the first tempering fluid. The profile housing 113 can in turn dissipate heat via the integrated second fluid channel 112 with a second tempering fluid, e.g. a water-glycol mixture. This gives the profile housing 113 the function of a heat exchanger, e.g. for temperature ranges from −50° C. to 60° C. The temperature range for operation of the battery module 100 may depend on the pour point of the second tempering fluid in the second fluid channels 112.

The liquid-tight housing 110 contains the individual battery cells 120, which are electrically connected to each other and held in position by structural parts, the cell holders 140. The cell holders 140 also have the function of covering lateral surfaces of the individual battery cells 120. A cell holder 140 may cover about 50% of the lateral surface. The cell holder 140 of a next row of battery cells 120 is positively adjacent to this cell holder 140 and covers the supplementary surface in such a way that the lateral surface of the battery cell 120 is delimited from the first tempering fluid over the entire circumference. This reduces the space that the first tempering fluid occupies.

The liquid-tight housing 120, which represents a closed container, is filled with the first tempering fluid to such an extent that a layer of gas, e.g. air, is created only in a upper area. The area is designed so that when the first tempering fluid expands under temperature, the enclosed air volume is reduced by the expansion volume of the first tempering fluid. This causes the pressure in the system to increase slightly. The seals of the liquid-tight housing 110 are designed to withstand this pressure increase of about 0.3 bar, 1.0 bar, 1.5 bar, or the like.

Due to the use of a liquid-tight housing 110, thermally independent battery modules 100 can be electrically connected with each other as desired to form a battery pack. This allows for a reduction of temperature differences between the battery modules 100, as the internal circulation of the first tempering fluid in the battery modules 100 may be regulated individually. However, desired temperature spreads between battery modules 100 can be implemented. This may be advantageous if a section of a battery system is used for a special application; in addition to electrical separation, thermal separation can be implemented for this case. The function of a heat exchanger is integrated into the liquid-tight housing 110 of the battery modules 100. This may save costs and weight. Further, there may be no need for complex and diverse seals. A common liquid (water-glycol), which does not have to have any special electrical properties, can be used as the second tempering fluid in the secondary circuit.

Summarizing, provided is a battery module, comprising a liquid-tight housing and a plurality of battery cells arranged in the liquid-tight housing. A first tempering fluid is included in the liquid-tight housing in thermal contact with the plurality of battery cells and with an inner surface of the liquid-tight housing. The liquid-tight housing is constructed to allow for a flow of a second tempering fluid between the inner surface and an outer surface of the liquid-tight housing. Further provided is a battery system comprising a battery module and a secondary tempering system connected to the liquid-tight housing of the battery module and configured to establish the flow of the second tempering fluid.

The invention claimed is:

1. A battery module, comprising
   a liquid-tight housing;
   a plurality of battery cells arranged in the liquid-tight housing; and
   a first tempering fluid included in the liquid-tight housing in thermal contact with the plurality of battery cells and with an inner surface of the liquid-tight housing;
   wherein the liquid-tight housing is constructed to allow for a flow of a second tempering fluid between the inner surface and an outer surface of the liquid-tight housing;
   wherein the liquid-tight housing comprises:
      a profile housing with two open end sides, which are located opposite to each other along the main axis of the battery module; and
      a first end plate and a second end plate liquid-tightly closing the profile housing at the two open end sides, and
   wherein the profile housing is configured as a double-walled profile housing, wherein a second fluid channel for the flow of the second tempering fluid is integrally formed.

2. The battery module according to claim 1, further comprising a pump arranged on an outside of the liquid-tight housing and connected to an interior of the liquid-tight housing via first fluid channels of the liquid-tight housing, wherein the pump is configured to generate a flow of the first tempering fluid within the liquid-tight housing by pumping the first tempering fluid through the first fluid channels.

3. The battery module according to claim 2, wherein the liquid-tight housing, the pump and the first fluid channels form a material closed system of the first tempering fluid.

4. The battery module according to claim 1, wherein (i) the second fluid channel protrudes into an interior of the liquid-tight housing; (ii) the second fluid channel has a circular cross section; (iii) the second fluid channel extends in a direction of a main axis of the battery module; or (iv) any combination of (i)-(iii).

5. The battery module according to claim 1, comprising
   a first seal arranged circumferentially between the first end plate and the profile housing; and
   a second seal arranged circumferentially between the second end plate and the profile housing.

6. The battery module according to claim 5, wherein (i) the first seal and the second seal are flat seals; (ii) the first seal and the second seal are each arranged in a plane perpendicular to the main axis of the battery module; or (iii) both (i) and (ii).

7. The battery module according to claim 1, wherein the profile housing comprises a material with a thermal conductivity of 50 W/(m·K) or higher.

8. The battery module according to claim 1, wherein (i) the profile housing comprises aluminium; (ii) the first end plate and/or the second end plate comprises a synthetic material; or both (i) and (ii).

9. The battery module according to claim 1, wherein the liquid-tight housing is partially filled with a gas.

10. The battery module according to claim 9, wherein a volume percentage of the liquid-tight housing filled by the gas is 5% or lower.

11. The battery module according to claim 1, wherein the liquid-tight housing is pressure-tight.

12. The battery module according to claim 11, wherein the liquid-tight housing is pressure-tight up to a positive pressure of at least 1 bar.

13. The battery module according to claim 1, further comprising a plurality of cell holders including half-shell shaped portions configured to hold the plurality of battery cells, wherein lateral surfaces of the plurality of battery cells are covered by the half-shell shaped portions.

14. The battery module according to claim 1, wherein each battery cell is electrically connected to one or more other battery cells in parallel or in series so as to form a battery stack.

15. The battery module according to claim 14, further comprising an electrical feedthrough connected to the battery stack.

16. A battery system, comprising
   a battery module according to claim 1; and
   a secondary tempering system connected to the liquid-tight housing of the battery module and configured to establish the flow of the second tempering fluid.

17. The battery system according to claim 16, wherein the first tempering fluid differs from the second tempering fluid.

* * * * *